(12) United States Patent
Braun et al.

(10) Patent No.: US 10,615,729 B2
(45) Date of Patent: Apr. 7, 2020

(54) METHOD FOR CONTROLLING A SYNCHRONOUS MACHINE AND CONTROL DEVICE FOR A SYNCHRONOUS MACHINE

(71) Applicant: Robert Bosch GmbH, Stuttgart (DE)

(72) Inventors: Martin Braun, Neustetten-Wolfenhausen (DE); Holger Rapp, Ditzingen (DE); Stefan Kurz, Frankfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/311,836

(22) PCT Filed: Apr. 21, 2017

(86) PCT No.: PCT/EP2017/059473
§ 371 (c)(1),
(2) Date: Dec. 20, 2018

(87) PCT Pub. No.: WO2017/220234
PCT Pub. Date: Dec. 28, 2017

(65) Prior Publication Data
US 2019/0207545 A1     Jul. 4, 2019

(30) Foreign Application Priority Data

Jun. 24, 2016  (DE) .......................... 10 2016 211 406

(51) Int. Cl.
*H02P 21/14*   (2016.01)
*H02P 6/10*    (2006.01)
(Continued)

(52) U.S. Cl.
CPC ................ *H02P 21/14* (2013.01); *H02P 6/10* (2013.01); *H02P 6/182* (2013.01); *H02P 25/026* (2013.01)

(58) Field of Classification Search
CPC ...... H02P 1/00; H02P 1/04; H02P 1/06; H02P 1/08; H02P 1/12; H02P 1/24; H02P 1/26;
(Continued)

(56) References Cited

U.S. PATENT DOCUMENTS 6,208,112 B1 *  3/2001  Jensen ..................... H02P 6/085
                                                    318/400.39
9,729,099 B1 *  8/2017  Lovas ...................... H02P 23/14
(Continued)

FOREIGN PATENT DOCUMENTS

DE        19860446         6/2000
DE      102004001932       8/2005
(Continued)

OTHER PUBLICATIONS

International Search Report for Application No. PCT/EP2017/059473 dated Nov. 10, 2017 (English Translation, 3 pages).

*Primary Examiner* — Antony M Paul
(74) *Attorney, Agent, or Firm* — Michael Best & Friedrich LLP

(57) ABSTRACT

The present invention provides control for synchronous machines in order to achieve an approximately constant torque irrespective of the load angle. The induced voltage of the synchronous machine rotating with a zero-current of the stator is first determined. Starting from the voltage plot of the induced voltage over the load angle, a current plot which achieves a constant torque irrespective of the load angle or any other default settings, can then be calculated. In particular, a non-sinusoidal current plot can also be calculated for non-sinusoidal plots of the induced voltage in the synchronous machine, in order to achieve desired settings that are as constant as possible irrespective of the load angle of the synchronous machine.

10 Claims, 4 Drawing Sheets

(51) Int. Cl.
   *H02P 6/182*   (2016.01)
   *H02P 25/026*  (2016.01)
(58) Field of Classification Search
   CPC .. H02P 1/265; H02P 1/42; H02P 1/423; H02P 1/46; H02P 1/465; H02P 1/48; H02P 1/50; H02P 1/52; H02P 3/00; H02P 3/06; H02P 3/14; H02P 4/00; H02P 5/00; H02P 6/00; H02P 6/005; H02P 6/006; H02P 6/008; H02P 6/04; H02P 6/08; H02P 6/10; H02P 6/12; H02P 8/00; H02P 8/08; H02P 9/00; H02P 11/00; H02P 21/00; H02P 21/0035; H02P 21/146; H02P 23/00; H02P 23/0004; H02P 23/004; H02P 25/021; H02P 27/00; H02P 27/04; H02P 27/06; H02M 3/22; H02M 3/33584; H02M 7/00; H02M 7/42; G05F 1/10

USPC ......... 318/400.01, 700, 701, 721, 799, 800, 318/801, 430, 432, 437, 599, 811, 650, 318/71, 718; 324/177
   See application file for complete search history.

(56)   References Cited

U.S. PATENT DOCUMENTS 9,852,837  B2*  12/2017  Lu ................... G01R 15/183
   2016/0211781 A1*  7/2016  Jiang ................. H02P 6/182

FOREIGN PATENT DOCUMENTS

DE   102011089341   7/2012
   DE   102011009872   8/2012
   EP       0831580    3/1998
   WO     2010043454   4/2010

* cited by examiner

METHOD FOR CONTROLLING A SYNCHRONOUS MACHINE AND CONTROL DEVICE FOR A SYNCHRONOUS MACHINE

BACKGROUND OF THE INVENTION

The present invention relates to a method for controlling a synchronous machine and to a control apparatus for a synchronous machine. The present invention further relates to an electric drive system.

Document WO 2010 043 454 A1 discloses a method and an apparatus for the field-oriented control of a synchronous machine. For this purpose, a transverse current setpoint value, a longitudinal current setpoint value, a transverse current actual value and a longitudinal current actual value are identified. In this case, the transverse current serves to form the torque of the machine, while the longitudinal current serves to form the field or to weaken the field. Said values are fed to a controller, which identifies a longitudinal voltage component and a transverse voltage component. These are converted to voltages of a polyphase three-phase voltage system and then passed on to a pulse-controlled inverter. Furthermore, the stator currents of the machine are detected and, with knowledge of the rotor position angle, converted to the longitudinal and the transverse current actual value. The synchronous machine is controlled by the output signals of the pulse-controlled inverter.

Converter-fed synchronous machines are generally operated by way of sinusoidal currents independently of the form of their voltage induced by the excitation field. Initial voltage control for introducing said sinusoidal currents also takes place here in a sinusoidal manner. Deviations from the sinusoidal shape in the voltage induced by the excitation field can lead to disturbances in the current profile. These can be balanced, for example, by way of a disturbance variable observer. In this way, a virtually sinusoidal current profile is impressed into the synchronous machine in any case.

SUMMARY OF THE INVENTION

The present invention provides a method for controlling a synchronous machine, a control apparatus for a synchronous machine and an electric drive system.

The following is accordingly provided:

a method for controlling a synchronous machine, having a step for identifying a voltage profile at the terminals of the synchronous machine rotating without a stator current in the idle state and for calculating a current profile, which is suitable, in conjunction with the identified voltage profile, for achieving a predetermined state at the synchronous machine. The method further comprises a step for calculating a voltage profile at the terminals of the synchronous machine, which voltage profile is suitable for setting the calculated current profile at the synchronous machine. Finally, the method comprises a step for actuating the synchronous machine by way of the calculated voltage profile.

The following is furthermore provided:

a control apparatus for a synchronous machine, having a voltage measurement device, a computation apparatus and an actuation apparatus. The voltage measurement device is configured to identify a voltage profile, which, in the case of the synchronous machine rotating without current in the idle state, is induced in the stator winding thereof and which can therefore then be tapped at the stator terminals of the machine. The computation apparatus is configured to calculate a current profile, which is suitable, in conjunction with the identified voltage profile, for achieving a predetermined state of the synchronous machine. The computation apparatus is further configured to calculate a voltage profile at the terminals of the synchronous machine, which voltage profile is suitable for setting the calculated current profile at the synchronous machine. The actuation apparatus is configured to actuate the synchronous machine by way of the calculated voltage profile.

The following is also provided:

an electric drive system, having a synchronous machine, a control apparatus according to the invention and a voltage converter, which is configured to provide the voltage profile, which is calculated by the control apparatus, at the synchronous machine.

Advantages of the Invention

The present invention is based on the knowledge that a pulsating torque profile occurs when non-sinusoidal induced voltages in a synchronous machine interact with impressed sinusoidal currents. In this case, there is therefore no constant torque. In the case of low motor rotational speeds, said pulsating torque can make itself felt as jerking. In the case of higher rotational speeds, for example, undesired development of noise can occur on account of the pulsating torque.

The present invention is therefore based on the idea of taking this knowledge into account and providing control for a synchronous machine, which control leads, for example, to a virtually constant torque even in the case of non-sinusoidal induced voltages in the synchronous machine.

Through the inventive actuation of a synchronous machine, it is possible here to modify the current form for the actuation of the synchronous machine, in particular even in the case of a combination of synchronous torque and reluctance torque, in such a way that a constant overall torque is produced. The current form for the actuation of the synchronous machine can be modified here respectively also for other requirements, such as, for example, a constant power draw by the synchronous machine or the like, in such a way that the current to be impressed into the synchronous machine is always determined using the profile of the induced voltage.

The current and/or voltage profiles for the actuation of the synchronous machine can in this case be adjusted automatically and individually to the respective machine to be operated without an increased level of outlay being produced as a result.

Furthermore, the current form for the actuation of the synchronous machine can also take into account aging effects or temperature effects, as well as, where applicable, further influences that can change the profile of the induced voltage in the synchronous machine. Adjustment to the given ratios is also respectively possible here automatically.

The term "current profile" used in this description and in the patent claims can in this case comprise a transverse current profile and/or longitudinal current profile. In particular, the longitudinal and the transverse current systems can normally have profiles over the pole wheel angle that are different from one another. In the same way, the term "voltage profile" can also comprise a transverse voltage profile and/or longitudinal voltage profile.

In accordance with one embodiment, the predetermined state, for the achievement of which the current profile to be impressed into the synchronous machine is calculated, comprises a constant torque of the synchronous machine, in particular with or without taking into account a reluctance torque of the synchronous machine, or a constant power draw of the synchronous machine. Further requirements to which the current profile to be impressed can be adjusted using the induced voltage profile of the synchronous machine, are furthermore also possible.

In accordance with a further embodiment, the identification of the induced voltage profile comprises measurement of the voltage at the terminals of the synchronous machine in the idle state of the synchronous machine. For example, to this end, in the case of a synchronous machine rotating without current, the voltage at the terminals of the synchronous machine or at an apparatus coupled to the terminals of the synchronous machine, such as a power converter or similar, can be detected. In particular, for example, the induced voltage in the case of a synchronous machine rotating without current in the idle state can be determined by means of already present voltage measurement apparatuses at the output of a voltage controller electrically coupled to the synchronous machine.

In accordance with a further embodiment, the identification of the induced voltage profile comprises measurement of the voltage profile of an energized synchronous machine. To identify the induced voltage profile, the voltage drops across known impedances of the stator winding, in particular across known inductances and ohmic resistances, are in this case subtracted from the measured voltage profile of the energized synchronous machine. In this way, it is also possible for an energized synchronous machine to identify the induced voltage profiles.

In accordance with a further embodiment, the calculation of the current profile for achieving the predetermined state of the synchronous machine and/or the calculation of the voltage profile for setting the calculated current profile comprises a transformation between a stator-oriented coordinate system and a field-oriented coordinate system. The transformation between the stator-oriented and the field-oriented coordinate system makes it possible to efficiently control electric machines independently of the rotational speed of the electric machine. Such a transformation is known, for example, as "Park transformation".

In accordance with one embodiment, the transformation between the stator-oriented coordinate system and the field-oriented coordinate system is adjusted to a non-sinusoidal current profile and/or a non-sinusoidal voltage profile. By adjusting the transformation equations to non-sinusoidal current and/or voltage profiles, such non-sinusoidal current/voltage profiles can also be calculated efficiently.

In accordance with one embodiment, the step for identifying the induced voltage profile comprises low-pass filtering. In particular, the step for identifying the induced voltage profile can eliminate higher-frequency frequency components, such as, for example, harmonics above a predetermined multiple of the fundamental frequency. For example, limitation of the frequency spectrum of the induced voltage profile to seven times, eleven times or thirteen times the fundamental frequency is possible.

In accordance with one embodiment of the control apparatus for the synchronous machine, the control apparatus comprises a memory. Said memory can be configured to store the induced voltage profile identified by the voltage measurement device. It is particularly advantageous here to store the identified induced voltage profile in said memory as a function of the electrical pole wheel angle. It is also advantageous here, when storing the voltage profile in said memory, to carry out normalization to a rated voltage, the amplitude of the fundamental oscillation or the root mean square value of the induced voltage. The control device can be configured, in particular, to calculate the current profile using the voltage profile stored in the memory. In this way, an induced voltage profile identified once previously can be used over the operating duration of the synchronous machine without the induced voltage profile regularly having to be identified again. For example, the induced voltage profile can be identified at the end of the production of the synchronous machine or after the synchronous machine has been installed in a product, such as an electric or hybrid vehicle, for example. Furthermore, regular or event-triggered renewed identification of the induced voltage profile is also possible. Also, in this case, the respectively identified induced voltage can be stored in a memory in order to calculate on the basis thereof the parameters for the actuation of the synchronous machine.

The above refinements and developments can, where expedient, be combined with one another in any desired manner. Further refinements, developments and implementations of the invention also comprise combinations, which have not been explicitly mentioned, of features of the invention described above or below in respect of the exemplary embodiments. In particular, a person skilled in the art will in this case also add individual aspects as improvements or additions to the respective basic forms of the invention. In the description present here, the term "pole wheel angle" is used instead of the designation "electrical pole wheel angle" for the sake of simplicity.

BRIEF DESCRIPTION OF THE DRAWINGS

The present invention is explained in more detail in the following text with reference to the exemplary embodiments specified in the schematic figures of the drawings, in which.

DETAILED DESCRIPTION

Figure 1:
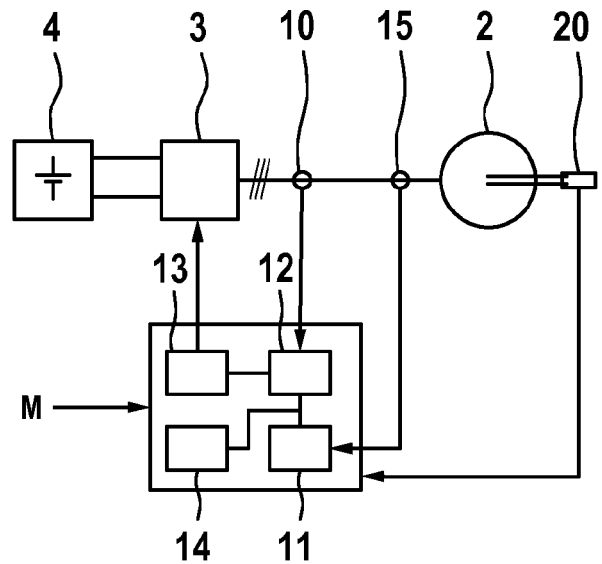
FIG. 1: shows a schematic illustration of a control apparatus for a synchronous machine in accordance with one embodiment.

FIG. 1 shows a schematic illustration of an electric drive system having a control apparatus for a synchronous machine 2. The synchronous machine 2 may be, for example, any desired synchronous machine. The synchronous machine 2 is fed by a converter 3. For example, the converter 3 may be an inverter or any other desired voltage converter that converts an input voltage to a voltage suitable for feeding the synchronous machine 2. In the exemplary embodiment illustrated here, the converter 3 converts a DC voltage to a three-phase AC voltage. Said three-phase AC voltage is then applied to the terminals of the synchronous machine 2. The embodiment illustrated here of a three-phase synchronous machine is to be understood as purely exemplary. Likewise, synchronous machines having a number of phases other than three are also possible. For example, four-phase or six-phase synchronous machines are also possible.

To supply voltage to the converter 3, the converter 3 is coupled to an electrical energy source 4. Said electrical energy source may be, for example, a DC voltage source. In particular, a traction battery of an electric or hybrid vehicle can be used as the electrical energy source. In this case, the electric drive system composed of the synchronous machine 2, the converter 3 and the electrical energy source 4 can be used, for example, as an electric drive system for an electric or hybrid vehicle. However, the application of the electric drive system is not limited to the use for electric or hybrid vehicles. Rather, the electric drive system can also be used for any other desired applications.

The electric drive system is controlled in this case by means of a control apparatus 1. To this end, the control apparatus 1 receives a specification for a predetermined state M and subsequently generates actuation signals for the converter 3. Based on the actuation signals for the converter 3, the converter 3 provides output voltages at the output connections thereof, which are coupled to the synchronous machine 2. According to these output voltages, electric currents are impressed in the synchronous machine 2. To control the synchronous machine 2, the control apparatus 1 evaluates the electric currents from the converter 3 into the synchronous machine 2 and also the rotational speed and/or rotor position of the synchronous machine 2. Based on a comparison of the specification for a predetermined state of the synchronous machine 2 with the values of the electric currents and also of the rotational speed and/or of the rotor position, the control apparatus 1 can adjust the actuation of the converter 3.

To detect the electric currents from the converter 3 into the synchronous machine 2, current sensors 10 can be provided between the converter 3 and the synchronous machine 2, which current sensors detect an electric current in a respective phase of the synchronous machine 2 and provide an output signal corresponding to the detected current. Said output signal of the current sensors 10 can in this case be provided both in an analog and a digital manner. For the detection of the rotor position of the synchronous machine and/or the rotational speed of the synchronous machine 2, a rotor position detector 20 can be provided at the synchronous machine 2. Said rotor position detector 20 can output an output signal corresponding to the rotational speed and/or the rotor position of the synchronous machine in analog or digital form and provide said output signal at the control apparatus 1. In particular, the pole wheel angle $\varphi\_el$ of the synchronous machine 2 can be calculated from said signal by the control apparatus.

The control apparatus 1 of the synchronous machine 2 comprises a voltage measurement device 11, a computation apparatus 12 and an actuation apparatus 13. The control apparatus 1 can also comprise a memory 14 and possibly still further components.

The control apparatus 1 for the synchronous machine 2 comprises a voltage measurement device 11 for identifying the voltage profiles at the terminals of the synchronous machine 2. To this end, the voltage measurement device 11 can be coupled, for example, to voltage sensors 15 at the outputs of the converter 3 or at the input terminals of the synchronous machine 2. Said voltage sensors 15 detect the respective voltages at the connections of the synchronous machine 2 and provide output signals corresponding to the detected voltages. Said output signals can be detected and evaluated by the voltage measurement device 11 of the control apparatus 1. In particular, the voltage measurement device 11 can in this case identify the voltage profiles produced at the terminals of the synchronous machine 2 when the synchronous machine rotates without current in the idle state and hence without a torque requirement. Said voltage profiles identified here correspond to the profiles of the voltages induced in the stator winding of the synchronous machine. For example, the converter 3 can be actuated for this purpose by an actuation apparatus 13 of the control apparatus 1 for the synchronous machine 2 in such a way that all of the power switches of the converter 3 are in the off state and consequently no current flows between the converter 3 and the synchronous machine 2.

The designation "without current" relates here to the stator currents of the synchronous machine 2. The method described here can be applied, for example, to permanent-magnet synchronous machines. Furthermore, the method can also be applied for electrically excited synchronous machines. For electrically excited synchronous machines, to identify the induced voltage profile in the idle state of the synchronous machine 2 without current, a constant field current has to be impressed into the field winding of the electrically excited synchronous machine 2. There are no other differences, with the result that the following text no longer specifically deals with electrically excited synchronous machines.

As an alternative, it is possible to measure the voltages induced in the synchronous machine even in the case of an energized synchronous machine. To this end, too, the stator voltages at the terminals of the synchronous machine 2 are also measured first. Then the voltage drops across known impedances of the stator windings are subtracted from the stator voltages at the terminals of the synchronous machine. Said known impedances can comprise, in particular, inductances and ohmic resistances of the stator windings. As an alternative to measuring the stator voltages at the terminals of the synchronous machine 2 or the output terminals of the converter 3, the stator voltages can in this case also be calculated from the respective switching state of the converter 3 and the input voltage thereof.

Subsequently, even if a three-phase voltage system to be described by at least two voltage components is discussed, reference is made synonymously to a voltage for the sake of understanding and, even if a three-phase current system is discussed, reference is made synonymously to a current.

The induced voltage profile at the terminals of the synchronous machine rotating in the idle state without current is identified as a function over the electrical pole wheel angle of the synchronous machine. The thus identified voltage profile of the voltage induced in the synchronous machine over the electrical pole wheel angle can be stored, for example, in a memory 14 of the control apparatus.

The induced voltage of the synchronous machine 2 over the pole wheel angle can be identified here, for example, at the end of production of the electric drive system. For example, the induced voltage profile of the synchronous machine 2 for an electric drive system in an electric or hybrid vehicle can be identified after the production of such a vehicle has finished. In addition or as an alternative, the identification of the induced voltage profile is also possible at any desired later point in time. For example, the identification of the induced voltage profile can also be repeated later at any time, in particular at regular times. In this way, it is possible to concomitantly take into account additional effects, such as, for example, the influence of a temperature or also aging effects. For a drive system in an electric or hybrid vehicle, the induced voltage can be identified, for example, during travel at a relatively low speed without torque requirement. At relatively high speeds, a negative longitudinal current is also usually necessary without torque requirement for the operation of the synchronous machine 2. As an alternative, the induced voltage can also be measured in the case of an energized synchronous machine 2, as has already been stated above.

In this way, it is possible to identify the profile of the induced voltage of a synchronous machine 2 rotating without current over the pole wheel angle for the synchronous machine 2 of the electric drive system individually and, where necessary, to store said profile of the induced voltage in the memory 14. On the basis of said profile of the induced voltage over the pole wheel angle, the computation apparatus 12 can consequently calculate the parameters for an actuation of the synchronous machine 2, which parameters are suitable for achieving a predetermined state of the synchronous machine. For example, the parameters for the actuation of the synchronous machine 2 can be identified for the most homogeneous torque possible, in particular the most constant torque possible over the full revolution of a synchronous machine 2. However, the actuation for further specifications, such as, for example, the most constant possible power draw of the synchronous machine or taking into account an additional reluctance torque are also likewise possible.

To this end, the computation apparatus 12 first calculates a setpoint current profile, which is intended to be fed into the synchronous machine 2, in order to achieve the desired specifications, such as, for example, a constant torque or a constant power draw. In this case, in particular, also non-sinusoidal profiles of the induced voltage that have been identified by the voltage measurement device can be taken into account. Said non-sinusoidal profiles of the induced voltage of the synchronous machine generally lead here to the setpoint current profile calculated by the computation apparatus 12 producing a non-sinusoidal profile over the pole wheel angle. Here, this applies both to the transverse current required for torque impression and to the longitudinal current possibly required for field weakening, wherein the longitudinal and transverse currents can have profiles that deviate from one another over the pole wheel angle. The computation apparatus 12 can in this case calculate a respective current to be fed into the synchronous machine for each pole wheel angle φ_el of the synchronous machine using the identified induced voltage profile, which current to be fed in leads to the desired specifications, such as, for example, to a prescribed torque or to a prescribed power draw. To this end, what is known as the transverse current setpoint value I_q,setpoint is multiplied by the associated normalized transverse current profiles i_q,a0(φ_el) and i_q,b0(φ_el) and what is known as the longitudinal current setpoint value I_d,setpoint is multiplied by the associated normalized longitudinal current setpoint values i_d,a0(φ_el) and i_d,b0(φ_el). The required current setpoint values $$i\_a,\text{setpoint}(\varphi\_el)=I\_q,\text{setpoint}*i\_q,a0(\varphi\_el)+I\_d,\text{setpoint}*i\_d,a0(\varphi\_el), \text{ and}$$

$$i\_b,\text{setpoint}(\varphi\_el)=I\_q,\text{setpoint}*i\_q,b0(\varphi\_el)+I\_d,\text{setpoint}*i\_d,b0(\varphi\_el)$$

are thus produced. These can then be converted again in a manner known per se to three-phase current setpoint values.

Based on the setpoint current profile calculated as described above by the computation apparatus 12, which setpoint current profile is intended to be fed into the synchronous machine 2 to achieve the specifications, the computation apparatus 12 can subsequently calculate a voltage profile, which has to be applied to the terminals of the synchronous machine 2 in order to feed the setpoint current profile calculated previously into the synchronous machine. The voltage profile calculated by the computation apparatus 12 can generally be calculated as a voltage profile over the pole wheel angle φ_el. The voltage profile can be calculated in a similar way to the calculation of the desired current profile given above, by virtue of field-oriented voltage setpoint values u_d and u_q each being multiplied by the normalized voltage profiles u_d,a0(φ_el), u_d,b0(φ_el), u_q,a0(φ_el) and u_q,b0(φ_el) calculated above depending on the pole wheel angle φ_el and the products are added in a corresponding manner. As an alternative, the voltage profile can also be calculated directly from the setpoint current profiles i_a,setpoint(φ_el) and i_b,setpoint(φ_el), for example taking into account the known parameters of the synchronous machine 2 such as inductances and resistances in the stator branches and the profile of the induced voltage over the pole wheel angle φ_el.

The actuation apparatus 13 can subsequently calculate the actuation signals for each time or each pole wheel angle φ_el of the synchronous machine 2 from the voltage profile calculated in this way, in particular the voltage profile over the pole wheel angle φ_el, which actuation signals have to be used to actuate the converter 3 in order to provide the calculated voltage profile at the terminals of the synchronous machine 2 by way of the converter 3. The actuation signals for the converter 3 identified here depend on the respective configuration of the converter 3. For conventional converters 3, methods of how such converters 3 have to be actuated to provide a prescribed voltage profile at the outputs of the converter 3 and therefore at the terminals of the synchronous machine 2 are already known.

By applying a voltage profile that corresponds to the voltage profile calculated previously to the terminals of the synchronous machine 2, the setpoint current profile calculated in the computation apparatus 12 is impressed into the synchronous machine 2. In this way, the specifications for the torque, the power draw or further specifications can be set very precisely for each phase angle of the synchronous machine.

The synchronous machine of the electric drive system can in this can be operated over a large rotational speed range. Accordingly, the converter 3 also has to be able to be operated over a frequency range corresponding to said rotational speed range, and the measurement values for current and voltage at the synchronous machine likewise vary over the frequency range corresponding to the rotational speed range. In order to keep the frequency range that a controller has to command as small as possible, it has proven to be advantageous to embody the control conventionally in what is known as a field-oriented coordinate system, which rotates with the excitation field of the synchronous machine. For sinusoidal current and voltage profiles, a transformation between the stator-oriented coordinate system, in which the synchronous machine is actuated, and the field-oriented coordinate system, in which the control is carried out, is known, for example, as a so-called "Park transformation". However, if the induced voltage of the synchronous machine has a non-sinusoidal profile over the pole wheel angle, a conventional transformation between the stator-oriented coordinate system and the field-oriented coordinate system is afflicted with disadvantages. Therefore, in one embodiment, the transformation between the stator-oriented coordinate system and the field-oriented coordinate system can be adapted to the non-sinusoidal profiles of the current and voltage. For example, to this end, the transformation equations for the transformation between the stator-oriented coordinate system and the field-oriented coordinate system can be adapted to the non-sinusoidal current or voltage profiles in the control apparatus 1 of the synchronous machine 2. This can take place, for example, in the form of an adapted calculation specification. As an alternative, the required values can be calculated in advance and be stored in the form of a look-up table or similar.

To simplify the transformation between the stator-oriented coordinate system and the field-oriented coordinate system and back, furthermore, a low-pass filtering or limiting of the current and/or voltage profiles to a prescribed order of harmonics can also take place. For example, the current or voltage signals can be limited to harmonics of 5, 7, 11 or 13 times the fundamental.

A special feature exists when the synchronous machine 2 has not just a synchronous torque but also a reluctance torque. Many permanent-magnet synchronous machines are designed so that they develop a reluctance torque in the case of field weakening, which reluctance torque amplifies the synchronous torque. For constant reluctance torques, however, sinusoidal stator currents and stator voltages are required. For a constant reluctance torque, therefore, sinusoidal longitudinal and transverse current profiles would also consequently be optimal. If the current forms or voltage forms for the actuation of the synchronous machine 2, as described above, are not optimized for non-sinusoidal profiles, this may produce a pulsating reluctance torque. To achieve the lowest possible pulsating of the total torque or also alternative specifications, an operating-point-dependent weighted average value formation can take place in this case, wherein the weighting can take place, for example, according to the components of the synchronous and reluctance torques at the total torque.

Figure 2:
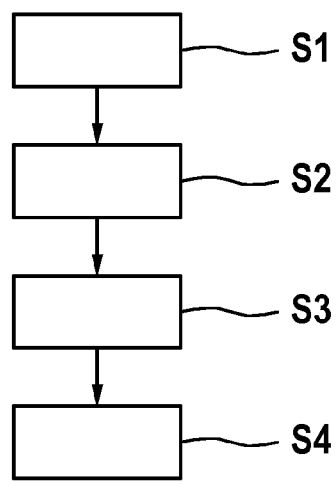
FIG. 2: shows a schematic illustration of a flow chart, as is based on a method for controlling a synchronous machine.

FIG. 2 shows a schematic illustration of a flow chart for a method for controlling a synchronous machine 2 in accordance with one embodiment. The method is suitable in this case, in particular, for being implemented by the control apparatus 1 described above, with the result that all of the steps described above for controlling the synchronous machine 2 can be realized by way of this method. Conversely, all of the method steps described subsequently can also be implemented by the control apparatus 1 described above.

In step S1, an induced voltage profile at the terminals of a synchronous machine 2 rotating without current is identified. In particular, the profile of the voltage induced in the stator winding of the synchronous machine is identified here over the pole wheel angle $\varphi\_el$. In step S2, a current profile is calculated, which current profile is suitable, in conjunction with the identified induced voltage profile, for achieving a predetermined state at the synchronous machine. For example, a constant torque independently of the pole wheel angle $\varphi\_el$, a constant power draw and the taking into account of a reluctance torque can be encompassed as a predetermined state.

In step S3, a voltage profile, in particular a voltage profile over the pole wheel angle $\varphi\_el$, is then calculated, which voltage profile is suitable for setting the current profile calculated previously at the synchronous machine. In step S4, the synchronous machine 2 is finally actuated by way of the calculated voltage profile. The actuation can be carried out here, in particular, by actuating a converter 3, which sets the calculated voltage profile at the synchronous machine 2 in accordance with the actuation.

To actuate the synchronous machine 2, a voltage profile that has to be set at the synchronous machine 2 in order to set the required current profile is also calculated from the calculated current profile. By actuating the synchronous machine with said calculated setpoint specifications, such as current profile or voltage profile, the most constant setpoint specifications possible can be realized even for non-sinusoidal induced voltages independently of the pole wheel angle $\varphi\_el$.

In the following text, the route from the measurement of the induced voltage to the specification of the voltages is explained for a specific exemplary embodiment with reference to FIGS. 3 to 7.

Figure 3A:
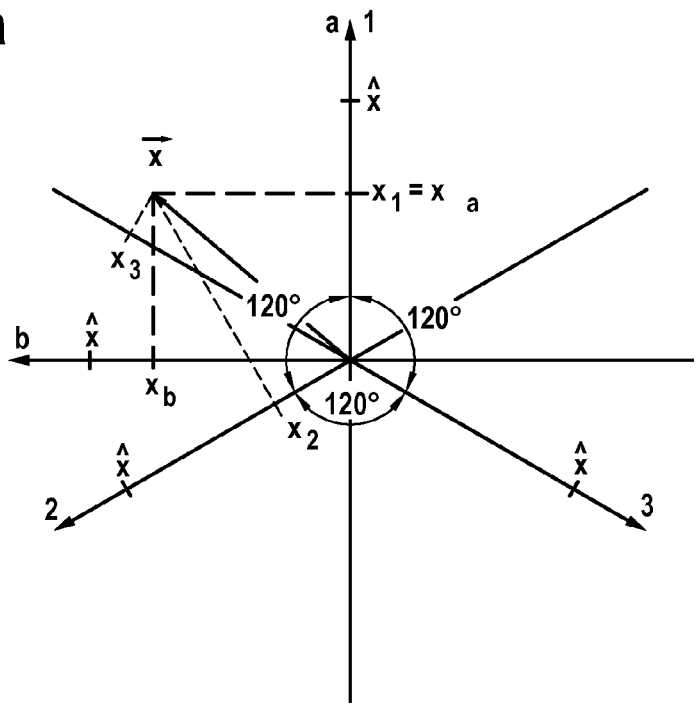
FIGS. 3a, b: show an illustration of a three-phase vector diagram with the axes 1, 2 and 3, the associated orthogonal coordinate system with the axes a=1 and b and a field-oriented coordinate system with the longitudinal axis d and the transverse axis q rotating with the rotor.
Figure 3B:
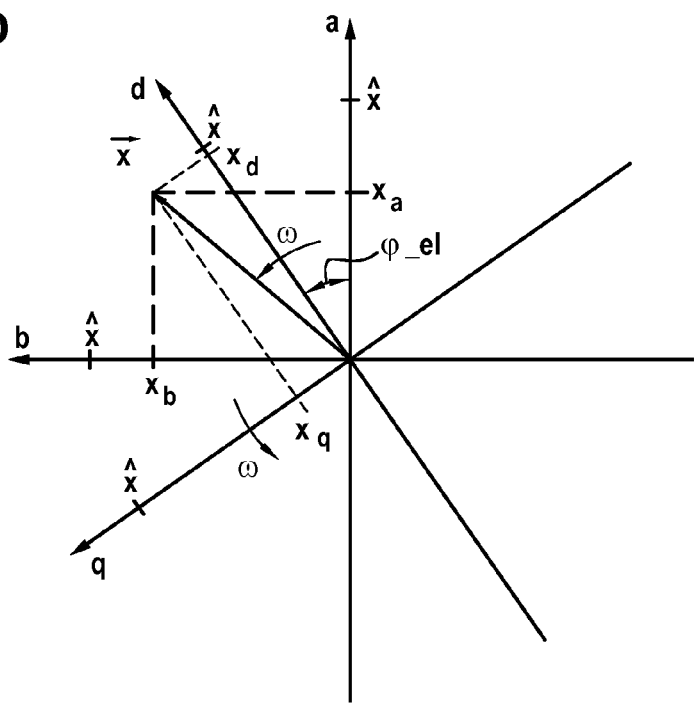

In FIGS. 3a and 3b, the correlations between a three-phase vector diagram with the axes 1, 2 and 3, the orthogonal coordinate system with the axes a=1 and b and the field-oriented coordinate system with the axes d and q are illustrated. The vector diagram in FIG. 3a has the three axes 1, 2 and 3 rotated by 120° respectively to one another. Each instantaneous value combination of a three-phase variable system can be illustrated by a vector x with the amplitude x in the plane. The three components x_1, x_2 and x_3 of said vector, which components are identified by projection of the vector onto the respective axis, always have the sum of 0, as is the case in three-phase variables. A sinusoidal three-phase current system can consequently be illustrated by a vector of constant amplitude revolving at a constant angular velocity co. The same vector can also be described unambiguously only by the two components x_a and x_b on the axes a and b of the orthogonal coordinate system. FIG. 3b shows the likewise orthogonal field-oriented coordinate system, the axes d and q of which are rotated with respect to the stator-oriented axes a and b by the pole wheel angle $\varphi\_el$.

Figure 4:
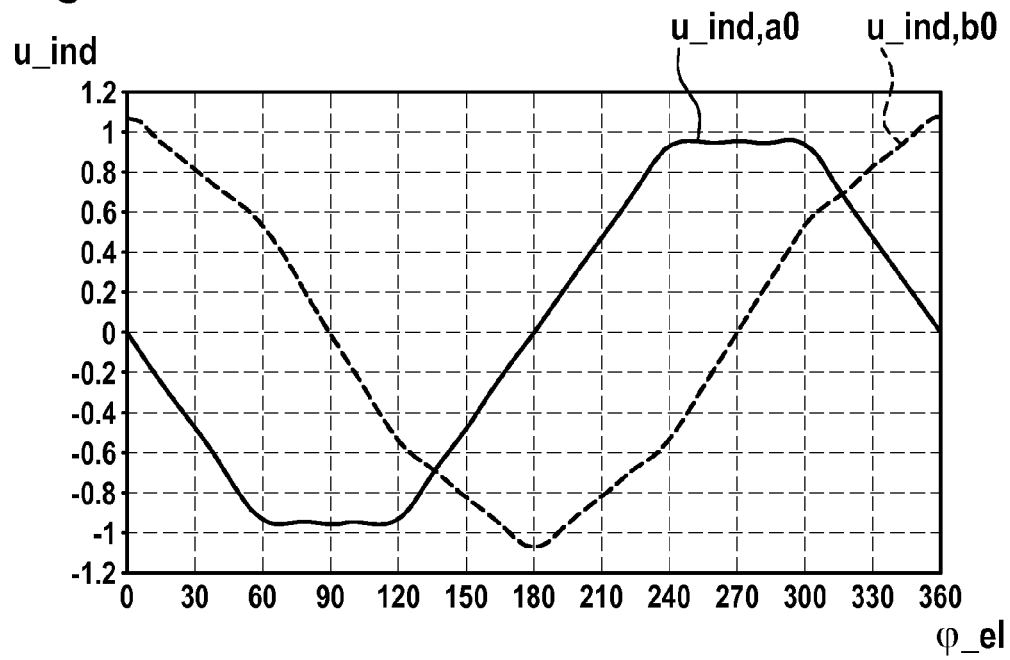
FIG. 4: shows an illustration for the profile of the induced voltages over the pole wheel angle.

FIG. 4 illustrates exemplary profiles of the normalized induced voltage $u\_ind,a0(\varphi\_el)$ and $u\_ind,b0(\varphi\_el)$, as can typically be measured at a synchronous machine with virtually trapezoidal induced voltages. The profiles illustrated there are also band-limited above the 13$^{th}$ harmonic of the fundamental. $u\_ind,a0$ is in qualitative terms the profile of the induced voltage measured in phase 1. In the other phases 2 and 3, the same voltage profile but offset by 120° and 240° respectively is induced. If the thus produced normalized vectors are projected onto the orthogonal axis b, the profile u_indb,0) is produced, which is likewise illustrated in FIG. 4.

Figure 5:
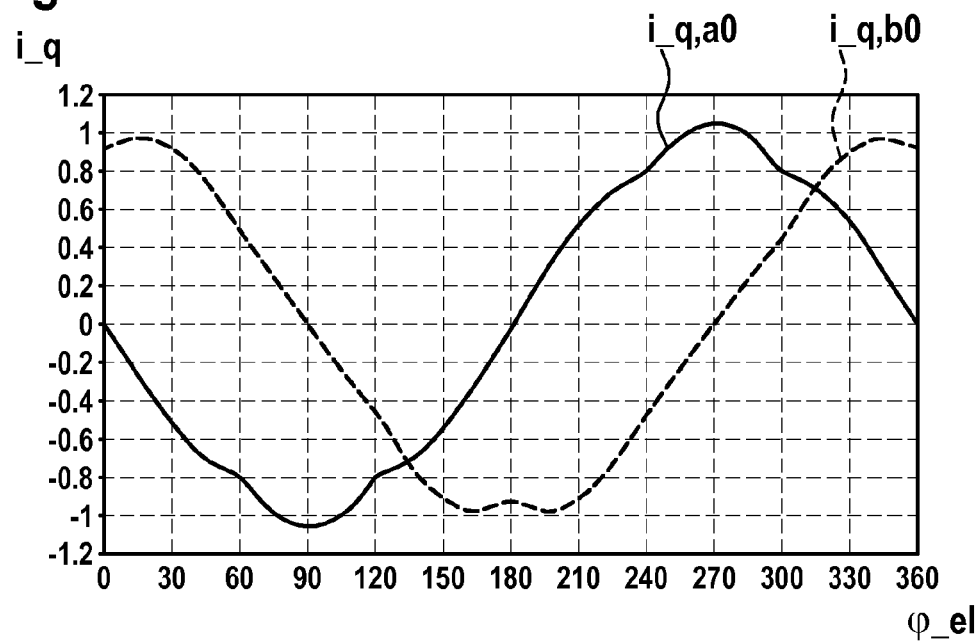
FIG. 5: shows an illustration for a profile of a transverse current system to be impressed over the pole wheel angle.

FIG. 5 illustrates an example for the normalized profiles of the transverse current components $i_q,a0(\varphi\_el)$ and $i\_q,b0(\varphi\_el)$, which leads in the case of the exemplary profiles of the induced voltages from FIG. 4 to a torque that is constant over the pole wheel angle. In the present example, the normalized transverse current profiles were determined in accordance with the calculation specification $i\_q,a0(\varphi\_el)=\sin^2(\varphi\_el)/u\_ind,a0(\varphi\_el)$ and $i\_q,b0(\varphi\_el)=\cos^2(\varphi\_el)/u\_ind,b0(\varphi\_el)$.

The normalized electrical power converted to mechanical power is thus produced with:

$i\_q,a0(\varphi\_el)*u\_ind,a0(\varphi\_el)+i\_q,b0(\varphi\_el)*u\_ind,b0(\varphi\_el)=$ $\sin^2(\varphi\_el)+\cos^2(\varphi\_el)=1$.

This ensures that the electrical power converted to mechanical power is constant and hence the torque is too. However, this is just one exemplary possibility that leads to a constant torque.

Figure 6:
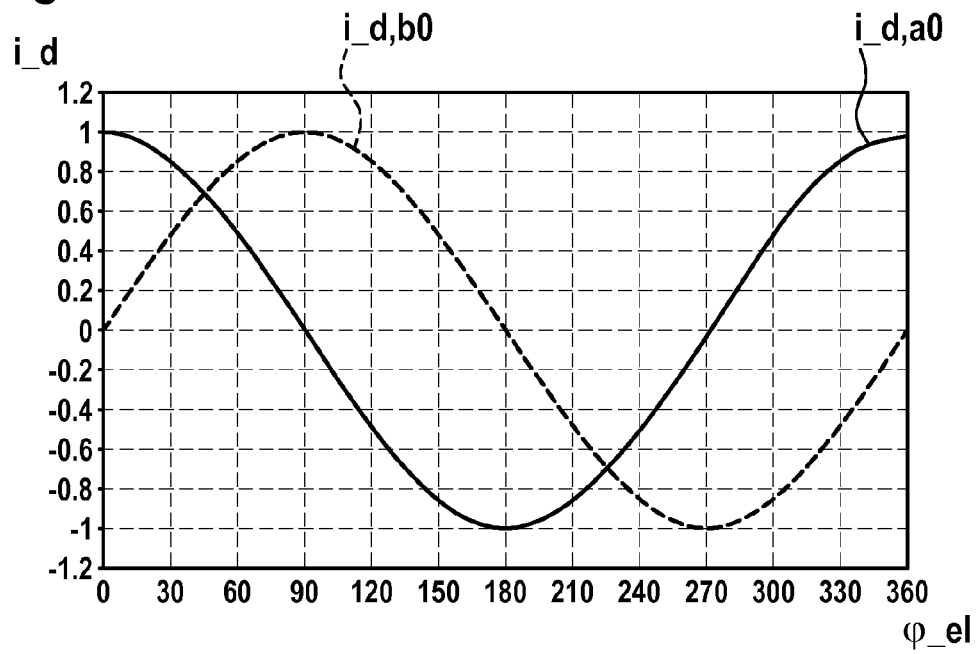
FIG. 6: shows an illustration of a profile of a longitudinal current system to be impressed over the pole wheel angle.

FIG. 6 illustrates an example of the normalized profiles of the longitudinal current components i_d,a0($\varphi$_el) and i_d,b0($\varphi$_el). These are selected so that the magnetic field of the permanent magnets is weakened or amplified by said longitudinal currents over the periphery of the air gap in a self-similar manner. The computation specification for this exemplary embodiment is as follows:

$$i\_d,a0(\varphi\_el)=\int u\_ind,a0(\varphi\_el)d\varphi\_el \text{ and}$$

$$i\_d,b0(\varphi\_el)=\int u\_ind,b0(\varphi\_el)d\varphi\_el.$$

When selecting the current forms for the longitudinal current system according to this exemplary embodiment, it is therefore also given that the normalized transverse voltage profiles u_q,a0($\varphi$_el) and u_q,b0($\varphi$_el), which are required for impressing said longitudinal current profiles, are each identical to u_ind,a0($\varphi$_el) and u_ind,b0($\varphi$_el), respectively.

Figure 7:
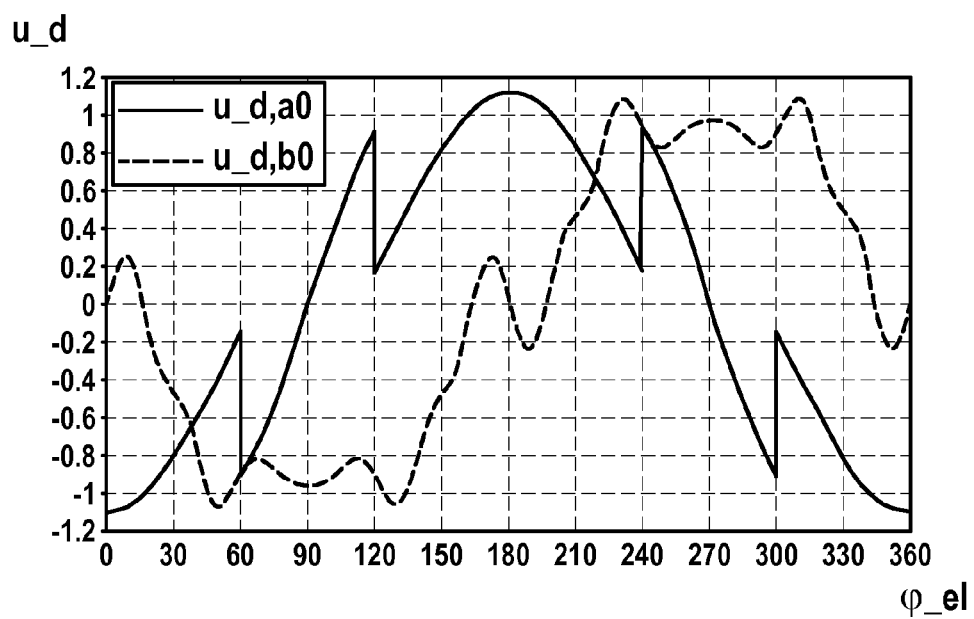
FIG. 7: shows an illustration of a profile of a longitudinal voltage system to be impressed.

FIG. 7 finally shows the normalized longitudinal voltage profiles u_d,a0($\varphi$_el) and u_d,b0($\varphi$_el), which are required for impressing transverse currents having the profiles according to FIG. 5. The computation specification for the identification thereof in the exemplary embodiment illustrated here is as follows:

$$u\_d,a0(\varphi\_el)=(i\_q,a0(\varphi\_el))/d\varphi\_el \text{ and}$$

$$u\_d,b0(\varphi\_el)=(i\_q,b0(\varphi\_el))/d\varphi\_el.$$

In conclusion, the present invention relates to actuation of synchronous machines for achieving an approximately constant torque independently of the pole wheel angle $\varphi$_el. To this end, the induced voltage of the synchronous machine rotating in the idle state is first identified. Proceeding from the voltage profile of the induced voltage over the pole wheel angle $\varphi$_el, a current profile can then be calculated, which current profile achieves a constant torque or any other desired specifications independently of the pole wheel angle $\varphi$_el of the synchronous machine 2. In particular, in this case, even for non-sinusoidal profiles of the induced voltage of the synchronous machine 2, a likewise non-sinusoidal current profile can be calculated in order to be able to realize the most constant possible setpoint specifications independently of the pole wheel angle $\varphi$_el of the synchronous machine.

The invention claimed is:

1. A method for controlling a synchronous machine (2), the method comprising:
    identifying (S1), via a voltage sensor and an electronic controller, a voltage profile at the terminals of the synchronous machine (2) rotating without a stator current;
    calculating (S2), via the electronic controller, a current profile, which is suitable, in conjunction with the identified voltage profile, for achieving a predetermined state at the synchronous machine (2);
    calculating (S3), via the electronic controller, a voltage profile at the terminals of the synchronous machine (2), which voltage profile is suitable for setting the calculated current profile at the synchronous machine (2); and
    actuating (S4), via the electronic controller, the synchronous machine by way of the calculated voltage profile.

2. The method as claimed in claim 1, wherein the predetermined state of the synchronous machine (2) comprises (a) a constant torque of the synchronous machine (2), (b) a constant power draw of the synchronous machine (2), (c) a reluctance torque of the synchronous machine (2), or a combination of (a), (b) and (c).

3. The method as claimed in claim 1, wherein the identification (S1) of the voltage profile comprises the measurement of the voltage at the terminals of the synchronous machine (2) during operation of the synchronous machine (2) without a stator current.

4. The method as claimed in claim 1, wherein the identification (S1) of the voltage profile comprises the measurement of the voltage profile of an energized synchronous machine (2) and the subtraction of voltage drops at known impedances of the stator winding of the synchronous machine (2).

5. The method as claimed in claim 1, wherein the calculation (S2) of the current profile and/or the calculation (S3) of the voltage profile comprises a transformation between a stator-oriented coordinate system and a field-oriented coordinate system.

6. The method as claimed in claim 5, wherein the transformation between the stator-oriented coordinate system and the field-oriented coordinate system is adjusted to a non-sinusoidal current profile and/or a non-sinusoidal voltage profile.

7. The method as claimed in claim lone of claim 1, wherein the step (S1) for identifying the voltage profile comprises low-pass filtering of the identified voltage profile.

8. An electronic controller (1) for a synchronous machine (2), the electronic controller comprising:
    a voltage measurement device (11), which is configured to identify a voltage profile, which is induced in the stator winding of the synchronous machine (2) rotating without a stator current;
    a computation apparatus (12), which is configured to calculate a current profile, which is suitable, in conjunction with the identified voltage profile, for achieving a predetermined state at the synchronous machine (2) and to calculate a voltage profile at the terminals of the synchronous machine (2), which voltage profile is suitable for setting the calculated current profile at the synchronous machine (2); and
    an actuation apparatus (13), which is configured to actuate the synchronous machine (2) by way of the calculated voltage profile.

9. The control apparatus (1) as claimed in claim 8, having a memory (14), which is configured to store the voltage profile identified by the voltage measurement device (11), wherein the computation apparatus (12) is configured to calculate the current profile using the voltage profile stored in the memory (14).

10. An electric drive system, having:
    a synchronous machine (2),
    an electronic controller (1) for a synchronous machine (2) as claimed in claim 8, and
    a voltage converter (3), which is configured to provide the voltage profile, which is calculated by the control apparatus (1), to the synchronous machine (2).

* * * * *